(12) United States Patent
Becoulet et al.

(10) Patent No.: US 10,443,448 B2
(45) Date of Patent: Oct. 15, 2019

(54) PROPULSIVE ASSEMBLY HAVING DECOUPLABLE CASING PORTIONS

(71) Applicant: SAFRAN AIRCRAFT ENGINES, Paris (FR)

(72) Inventors: Julien Fabien Patrick Becoulet, Moissy-Cramayel (FR); Sylvain Bories, Moissy-Cramayel (FR); Alexandre Jean-Marie Tan-Kim, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 92 days.

(21) Appl. No.: 15/757,138

(22) PCT Filed: Aug. 30, 2016

(86) PCT No.: PCT/FR2016/052146
§ 371 (c)(1),
(2) Date: Mar. 2, 2018

(87) PCT Pub. No.: WO2017/037378
PCT Pub. Date: Mar. 9, 2017

(65) Prior Publication Data
US 2018/0245480 A1    Aug. 30, 2018

(30) Foreign Application Priority Data
Sep. 4, 2015    (FR) ..................................... 15 58212

(51) Int. Cl.
*F01D 25/24*    (2006.01)
*F01D 21/04*    (2006.01)
(Continued)

(52) U.S. Cl.
CPC ......... *F01D 25/243* (2013.01); *F01D 21/045* (2013.01); *F02C 7/20* (2013.01);
(Continued)

(58) Field of Classification Search
CPC .... F01D 25/243; F01D 25/265; F01D 21/045; F01D 9/042; F02K 1/04; F16D 1/033;
(Continued)

(56) References Cited

U.S. PATENT DOCUMENTS 8,444,084 B2 * 5/2013 Udall ..................... B64D 27/20
244/54
8,573,922 B2 * 11/2013 Milfs .................... F01D 21/045
384/624
(Continued)

FOREIGN PATENT DOCUMENTS

EP    2 397 710 A2    12/2011
FR    2 927 954 A1    8/2009

OTHER PUBLICATIONS

International Search Report and English Translation dated Dec. 20, 2016 in International Application No. PCT/FR2016/052146 (7 pages).

*Primary Examiner* — Carlos A Rivera
*Assistant Examiner* — Behnoush Haghighian
(74) *Attorney, Agent, or Firm* — Bookoff McAndrews, PLLC

(57) ABSTRACT

A propulsive assembly including a turbine engine configured to be fastened to an aircraft by means of a suspension, having certain casing portions suitable for being decoupled so as to attenuate certain bending modes of the turbine engine in the event of an incident, the propulsive assembly comprising at least first and second casing portions (33a, 22) extending axially one after another, one of said casing portions being cantilevered out relative to said suspension, wherein a first casing portion (33a) possesses a first fastener portion (41) connected rigidly to the body (43) of the first casing portion (33a) and a second fastener portion (42) connected more flexibly to the body (43) of the first casing portion (33a), and wherein the second casing portion (22) is (Continued)

fastened to the second fastener portion (42) of the first casing portion (33a) in a manner that is permanent, and to the first fastener portion (41) of the first casing portion (33a) in a manner that is releasable.

10 Claims, 4 Drawing Sheets

(51) Int. Cl.
    *F02K 1/04*     (2006.01)
    *F02C 7/20*     (2006.01)
    *F16D 1/033*     (2006.01)
    *F16D 1/076*     (2006.01)
    *F01D 25/26*     (2006.01)
    *F16L 23/00*     (2006.01)
    *F16L 27/10*     (2006.01)

(52) U.S. Cl.
    CPC .............. *F02K 1/04* (2013.01); *F01D 25/265* (2013.01); *F05D 2220/323* (2013.01); *F05D 2240/14* (2013.01); *F05D 2260/311* (2013.01); *F16D 1/033* (2013.01); *F16D 1/076* (2013.01); *F16L 23/00* (2013.01); *F16L 27/1012* (2013.01); *Y02T 50/671* (2013.01)

(58) Field of Classification Search
    CPC ....... F16D 1/076; F16L 23/00; F16L 27/1012; F16L 47/14; F16L 49/04
    USPC ........................................ 403/335, 336, 337
    See application file for complete search history.

(56) References Cited

U.S. PATENT DOCUMENTS

| | | | | |
|---|---|---|---|---|
| 8,919,136 | B2* | 12/2014 | Conete | F02K 1/04 60/796 |
| 9,080,461 | B2* | 7/2015 | Ivakitch | F01D 5/066 |
| 2006/0060697 | A1* | 3/2006 | Beaufort | B64D 29/06 244/53 B |
| 2011/0203255 | A1* | 8/2011 | Conete | F02K 1/04 60/226.1 |
| 2011/0305567 | A1* | 12/2011 | Milfs | F01D 21/045 415/229 |
| 2012/0247123 | A1* | 10/2012 | Garry | F01D 25/243 60/798 |
| 2016/0215638 | A1* | 7/2016 | Porter | F01D 11/005 |
| 2016/0215639 | A1* | 7/2016 | Porter | F01D 11/005 |
| 2017/0167282 | A1* | 6/2017 | Kloetzer | F01D 11/003 |
| 2017/0284225 | A1* | 10/2017 | Hashimoto | F01D 25/14 |
| 2018/0298822 | A1* | 10/2018 | Ac | F01D 25/164 |

* cited by examiner

PROPULSIVE ASSEMBLY HAVING DECOUPLABLE CASING PORTIONS

CROSS-REFERENCE TO RELATED APPLICATION(S)

This patent application is a U.S. national phase entry under 35 U.S.C. § 371 of International Application No. PCT/FR2016/052146, filed Aug. 30, 2016, which claims the priority benefit under 35 U.S.C. § 119 to French Application No. 1558212, filed on Sep. 4, 2015, the entireties of which are incorporated herein by reference.

FIELD OF THE INVENTION

The present disclosure relates to a propulsive assembly including a turbine engine in which certain casing portions can be decoupled in order to attenuate certain modes of vibration of the engine in the event of an incident.

Such teaching may be applied to any type of propulsive assembly, including a turbine engine. Nevertheless, it is particularly applicable to airplane turbojets, in particular as a precaution against the risk of ingesting a bird.

STATE OF THE PRIOR ART

Propulsive assemblies of the high bypass ratio turbojet type possess large masses that are cantilevered out from the suspension of the engine, whether at the front or the rear of the engine. Certain elements of the nacelle, such as the air intake duct, the nozzle, or the exhaust cone thus represent large cantilevered-out masses.

These cantilevered-out masses thus generate a large bending moment on the engine. In the event of unbalance of the fan, caused by blades being moved, damaged, or lost as a result of ingesting a bird, for example, certain modes of vibration are amplified, and then give rise to large loads that fastener flanges of the various portions of the casing of the propulsive assembly must be dimensioned to accommodate, particularly at the interfaces with these cantilevered-out elements.

In particular, in the event of such an incident, the propulsive assembly must be capable of withstanding these limit loads for a certain minimum duration defined by certification regulations, thereby naturally subjecting the structures to high levels of fatigue and thus requiring design dimensions that are large.

In order to reduce the magnitudes of these modes of vibration and thus the sizes of the loads imparted in the event of fan unbalance, proposals have already been made to decouple certain elements of the rotor relative to the stator. This makes it possible to modify the excitation generated by the rotor and thus to attenuate certain modes of vibration of the propulsive assembly. Nevertheless, decoupling portions of the rotor in this way gives the rotor greater freedom to move within the stator and thus leads to a significant risk of extensive damage to the engine as a whole.

Document US 2011/203255 describes a casing portion that possesses a flexible fastener portion.

There exists therefore a real need for a propulsive assembly enabling certain modes of vibration of the turbine engine to be reduced and that does not suffer, at least in part, from the drawbacks inherent to the above-mentioned known configurations.

SUMMARY OF THE INVENTION

The present disclosure relates to a propulsive assembly including a turbine engine configured to be fastened to an aircraft by means of a suspension, the assembly comprising at least first and second casing portions extending axially one after another, one of said casing portions being cantilevered out relative to said suspension, wherein a first casing portion possesses a first fastener portion connected rigidly to the body of the first casing portion and a second fastener portion connected more flexibly to the body of the first casing portion, and wherein the second casing portion is fastened to the second fastener portion of the first casing portion in a manner that is permanent, and to the first fastener portion of the first casing portion in a manner that is releasable.

In the present disclosure, the terms "axial", "radial", "tangential", "inner", "outer", and their derivatives are defined relative to the main axis of the turbine engine; the term "axial plane" designates a plane containing the main axis of the turbine engine and the term "radial plane" designates a plane perpendicular to the main axis; finally, the terms "upstream" and "downstream" are defined relative to the flow of air through the engine. Furthermore, the term "extending axially one after another" does not set out to be limited to a particular axial direction: thus, the first casing portion may be situated equally well upstream or downstream relative to the second casing portion.

Furthermore, in the present disclosure, the terms "flexible" and "rigid" are defined relative to each other; thus, the connection between the first fastener portion and the casing body is considered as being "flexible" in the meaning of the present disclosure if it presents bending stiffness that is less than that of the connection between the first fastener portion and the casing body, which constitutes a reference stiffness, and regardless of the actual stiffness. Nevertheless, and preferably, the bending stiffness of the "flexible" connection is less than 90%, more preferably less than 80% of the bending stiffness of the "rigid" connection.

Furthermore, in the present disclosure, a part is considered as being cantilevered out relative to the suspension when it is situated upstream from the most upstream suspension point of the engine or downstream from the most downstream suspension of the engine.

Finally, in the present disclosure, the terms "permanent" and "releasable" are used in contrast to each other: a fastening is thus considered as being "releasable" if it can be undone, broken, or released, while the propulsive assembly is in operation, either on command, or else on the occurrence of a pre-established condition such as exceeding a stress level, e.g. in modes of emergency operation, and in particular in the event of an incident (which condition may in particular be associated with detecting an unbalance of the rotary assembly that exceeds a predetermined threshold; in contrast, a fastening is considered as being "permanent" in the meaning of the present disclosure if it is not configured to be undone while the propulsive assembly is in operation. The definition of a "permanent" fastening thus refers to the operation of the propulsive assembly and does not set out to exclude the possibility of the fastening being disassembled when the propulsive assembly is not in operation, e.g. while it is being maintained. Furthermore, it is considered that the connection is released if its stiffness drops by more than 50% relative to the stationary state: thus, it is considered that a connection is released even if a loose physical link persists after the connection between the two parts that were initially fastened together has been broken.

Under such circumstances, by means of the configuration as proposed in this way, the second casing portion is rigidly fastened to the first casing portion during normal operation of the propulsive assembly: the connection is made both by the first fastener portion of the first casing portion via a rigid connection part, and also by a second fastener portion via a flexible connection path.

In contrast, when necessary, e.g. when the mode of vibration of the engine reaches a threshold value leading to stresses that are unacceptable, typically in the event of an unbalance appearing in the fan as a result of ingesting a bird, the fastening connecting the second casing portion to the first fastener portion of the first casing portion may be broken in such a manner that the second casing portion is then fastened to the first casing portion only via its second fastener portion, and thus solely via the flexible connection path. Under such circumstances, this reduces the stiffness of the fastening between the first and second casing portions, thereby modifying the dynamic response of the system and thus contributing to reducing the frequency and the magnitude of the modes of vibration of the propulsive assembly.

Consequently, the stresses to which the propulsive assembly is subjected following such an incident are reduced, thereby enabling it to remain intact for longer after the incident. Certification tests are thus easier to satisfy, and under real conditions, a pilot thus has a greater length of time for landing the airplane before more severe damage to the engine.

Furthermore, under equal certification conditions, the stresses imparted are lower, so it is possible to lighten the structures and thus reduce the weight of the propulsive assembly, and hence reduce its fuel consumption.

In certain embodiments, said casing portion that is cantilevered out relative to the suspension is cantilevered out relative to a casing portion that is directly connected to the suspension.

In certain embodiments, said casing portion that is directly connected to the suspension is the other one of said first and second casing portions.

In certain embodiments, the turbine engine comprises a rotor and a stator, the rotor including a fan driven by a shaft mounted to rotate relative to the stator via at least two bearings.

In certain embodiments, the center of gravity of said casing portion that is cantilevered out relative to the suspension is situated axially further upstream than the most upstream of said bearings or further downstream than the most downstream of said bearings.

In certain embodiments, said casing portion that is cantilevered out relative to the suspension is cantilevered out relative to a bearing carried by a casing portion that is directly connected to the suspension.

In certain embodiments, said casing portions are annular and are arranged around the rotor shaft of the engine.

In certain embodiments, the first fastener portion of the first casing portion is connected to the body of the first casing portion by means of a first connection portion, and the second fastener portion of the first casing portion is connected to the body of the first casing portion by means of a second connection portion, and the second connection portion possesses bending stiffness that is at least 10% less than the bending stiffness of the first connection portion, preferably at least 20% less.

In certain embodiments, the second connection portion is perforated. This constitutes easy and inexpensive means for reducing the stiffness of the connection portion. Holes may in particular be made in the second connection portion. In other embodiments, the second connection portion may be made up of a series of disjoint plates or columns, for example.

In certain embodiments, the second connection portion is of thickness that is smaller than the first connection portion.

In certain embodiments, the second connection portion is made of a material that is more flexible than the first connection portion.

In certain embodiments, the first connection portion extends the body of the first casing portion. This serves to provide good rigidity for the first connection portion.

In certain embodiments, the second connection portion bifurcates from the body of the first casing portion. In this way, the flexible connection portion may extend along the rigid connection portion so as to facilitate its interface with the second casing portion. Furthermore, this bifurcation may contribute to provide flexibility to the second connection portion.

In certain embodiments, the first fastener portion of the first casing portion is a first fastener flange.

In certain embodiments, the second fastener portion of the first casing portion is a second fastener flange.

In certain embodiments, the second casing portion is fastened to the first and second fastener portions of the first casing portion by means of a common fastener portion. This makes the interface between the first and second casing portions more compact.

In certain embodiments, the fastener portion of the second casing portion is a fastener flange.

In certain embodiments, the second casing portion is fastened to the first fastener portion of the first casing portion independently of its fastening to the second fastener portion of the first casing portion. This facilitates effective separation of the second casing portion from the first fastener portion of the first casing portion when the fastening is released.

In certain embodiments, the first and second fastener portions of the first casing portion are festooned. This configuration facilitates independent fastening of the first and second fastener flanges of the first casing portion with the common fastener flange of the second casing portion. This also facilitates alternating fastener points with the first flange and with the second flange.

In certain embodiments, the second casing portion is fastened in releasable manner to the first fastener portion of the first casing portion by using breakable fastener means. In particular they may comprise break screws or bolts.

In certain embodiments, the breakable fastener means are configured to break when they are subjected to a stress exceeding a predetermined threshold value.

In other embodiments, the breakable fastener means are configured to break on command, e.g. by using pyrotechnic bolts.

In certain embodiments, the second casing portion is fastened in permanent manner to the second fastener portion of the first casing portion by using conventional fastener means (i.e. non-breakable fastener means).

In certain embodiments, the propulsive assembly also includes a nacelle and one of the first and second casing portions is a casing portion of the turbine engine, while the other one of the casing portions is a casing portion of the nacelle. Preferably, the first casing portion forms part of the turbine engine and carries one of said bearings, while the cantilevered-out second casing portion forms part of the nacelle. Specifically, it is often nacelle casing portions that are situated at the upstream and downstream ends of the propulsive assembly, and that are thus cantilevered out to a great extent, and that are therefore responsible for a large bending moment.

In certain embodiments, said nacelle casing portion is an exhaust cone, also often referred to as a "plug". Said turbine engine casing portion may then be a turbine rear casing, also referred to as a turbine rear vane (TRV). Specifically, the exhaust cone is of considerable weight and is situated at the downstream end of the engine.

In other embodiments, the nacelle casing portion is a nozzle. Said engine casing portion may then be the rear turbine casing. Specifically, the nozzle is likewise situated at the downstream end of the engine, concentrically around the exhaust cone.

In other embodiments, said nacelle casing portion is an air intake duct, also often referred to as an "air inlet". Said engine casing portion may then be a fan casing. This air intake duct is of considerable weight and is situated at the upstream end of the engine.

The above-mentioned characteristics and advantages, and others, appear on reading the following detailed description of embodiments of the proposed propulsive assembly. The detailed description makes reference to the accompanying drawings.

BRIEF DESCRIPTION OF THE DRAWINGS

The drawings are diagrammatic and seek above all to illustrate the principles of the invention.

In the drawings, from one figure to another, elements (or portions of an element) that are identical are referenced by the same reference signs.

DETAILED DESCRIPTION OF EMBODIMENT(S)

In order to make the invention more concrete, there follows a description in greater detail of an example propulsive assembly, which description is given with reference to the accompanying drawings. It should be recalled that the invention is not limited to this example.

Figure 1:
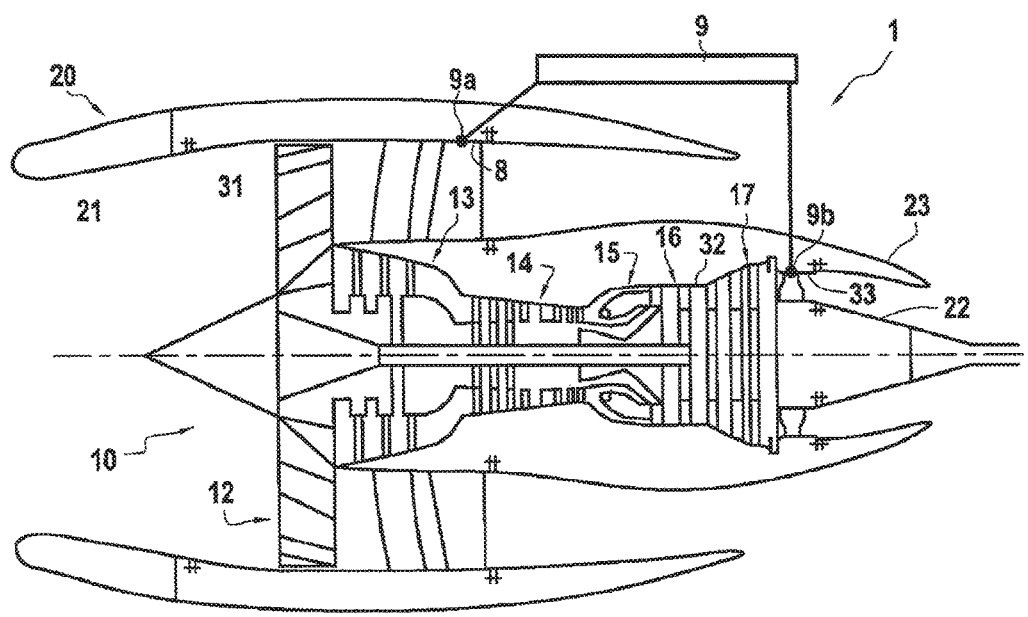
FIG. 1 is a plane section view of a propulsive assembly of the invention.

FIG. 1 is a section view of a propulsive assembly 1 of the invention on a vertical plane containing its main axis A. The assembly comprises a bypass turbojet 10 and a nacelle 20 surrounding the turbojet 10.

From upstream to downstream in the flow direction of the air stream, the turbojet 10 comprises: a fan 12; a low pressure (LP) compressor 13; a high pressure (HP) compressor 14; a combustion chamber 15; a high pressure (HP) turbine 16; and a low pressure (LP) turbine 17. These various members are protected by a plurality of casing portions that are generally cylindrical and that are fastened to one another via fastener flanges. Among these various casing portions, the turbojet 10 has a fan casing 31 surrounding the fan 12, an inter-turbine casing 32 extending between the HP turbine 16 and the LP turbine 17, and a rear turbine casing 33 extending behind the LP turbine 17 and including an inner shroud 33a and an outer shroud 33b.

The nacelle 20 has various casing portions serving in particular to guide the air stream: these various casing portions include in particular an air intake duct 21 located upstream from the fan casing 31 and guiding the air stream at the intake of the propulsive assembly 1 towards the fan 12; an exhaust cone 22 mounted downstream from the inner shroud of the rear turbine casing 33 and defining the inner envelope of the exhaust passage for the primary flow through the turbojet 10; and a nozzle 23 mounted downstream from the outer shroud of the rear casing of the turbine 33 and separating the exhaust passage for the primary flow from the turbojet 10 from the parallel secondary passage.

Typically, the turbojet 10 is fastened to the aircraft via a suspension 9 that is connected to the turbojet via at least two points 9a and 9b: the suspension is thus often connected to the upstream end of the intermediate casing 8 and to the downstream end of the rear turbine casing 33 or to the inter-turbine casing 32.

Figure 2:
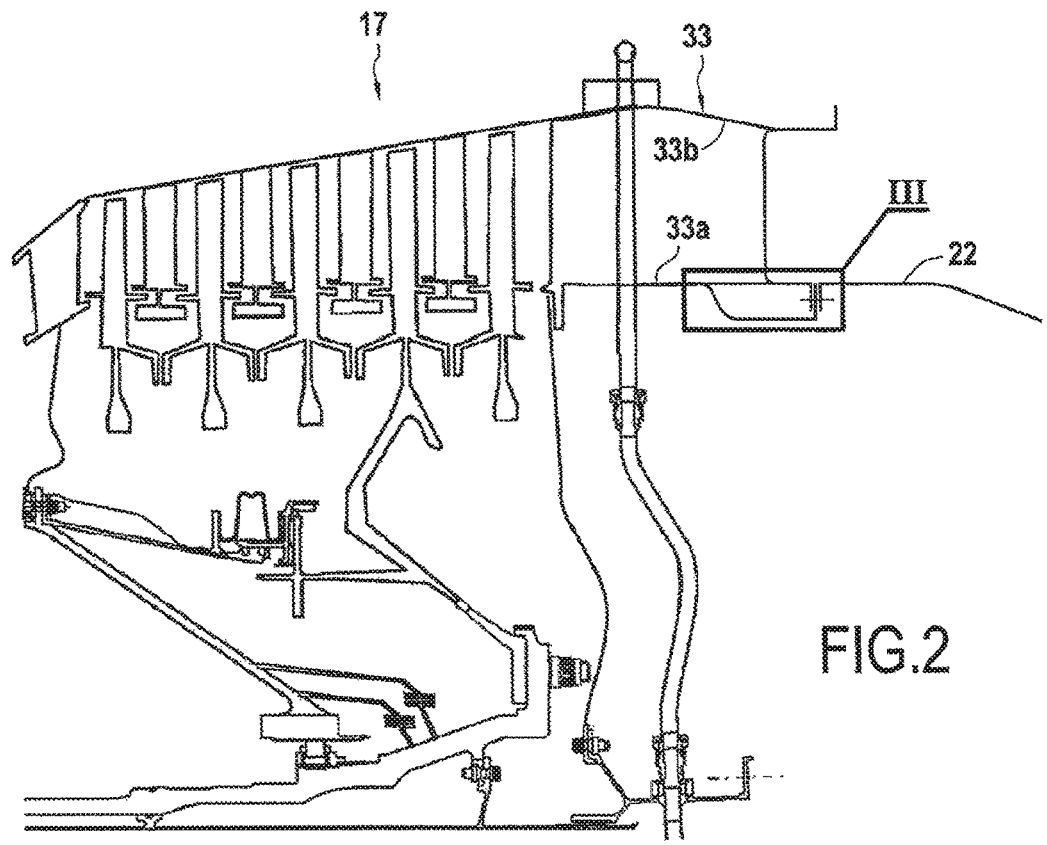
FIG. 2 is a section view of the interface zone between the rear turbine casing and the exhaust cone.

FIG. 2 shows the interface zone between the rear turbine casing 33 and the exhaust cone 22 in greater detail. For simplification purposes, the nozzle 23 is omitted from this figure.

Figure 3:
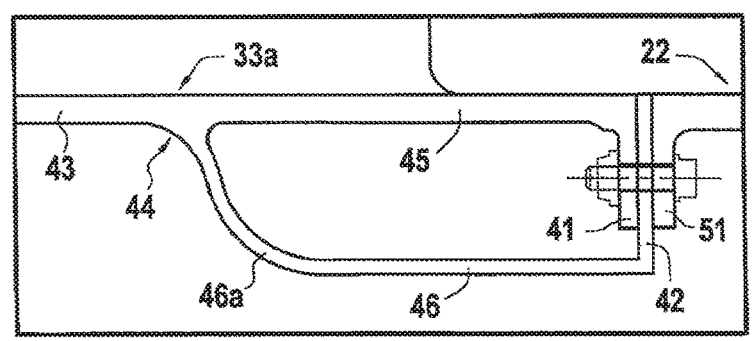
FIG. 3 is an enlarged view of box III in FIG. 2.

As can be seen better in FIG. 3, the inner shroud 33a of the rear turbine casing 33 possesses a first fastener flange 41 and a second fastener flange 42 at its rear end. More precisely, the body 43 of the inner shroud 33a is extended firstly in rectilinear manner to the first fastener flange 41 marking the downstream end of the inner shroud 33a; and secondly the second fastener flange 42 is connected to the body 43 via a ring 46 fitted to the inner surface of the casing body 43, or branched therefrom.

Thus, on going from upstream to downstream, it can be said that the casing body 43 reaches a bifurcation 44 leading firstly to the first fastener flange 41 via a first connection portion 45 that is in fact constituted by the rectilinear extension of the casing body 43, and to the second fastener flange 42 via a second connection portion 46 that is constituted by the ring.

In this example, the second connection portion 46 possesses thickness that is less than the thickness of the casing body 43 and thus less than the thickness of the first connection portion 45. Under such circumstances, the second connection portion 46 possesses bending stiffness that is less than the bending stiffness of the first connection portion 45. The second connection portion 46 also possesses a rounded portion 46a that also contributes to reducing its stiffness.

The exhaust cone 22 is provided at its upstream end with a single fastener flange 51 that is fastened simultaneously but in independent manner to the first and second fastener flanges 41 and 42 of the inner shroud 33a of the rear turbine casing 33: these fastenings are described below in greater detail with reference to FIGS. 4, 5, and 6.

Figure 4:
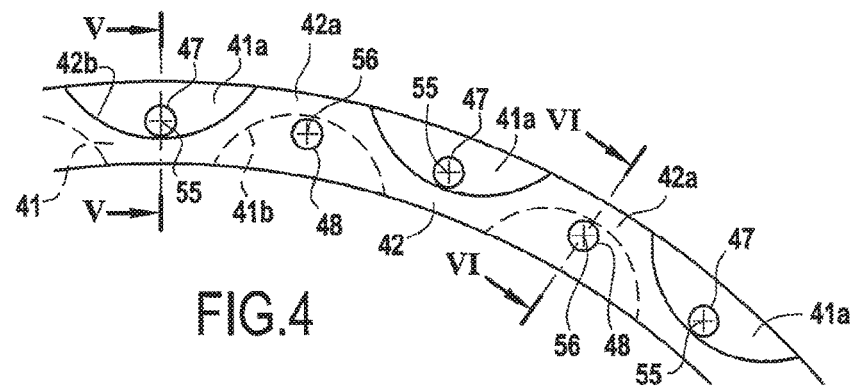
FIG. 4 is a plane view of fastener flanges of the rear turbine casing.

As can be seen in FIG. 4, the first and second fastener flanges 41 and 42 of the rear turbine casing 33 are festooned, i.e. they present a circumferential succession of festoons 41a and 41b extending radially in disjoint manner. Each festoon 42a of the second flange 42 is thus separated from its neighbor by a setback 42b where it is possible to place a festoon 41a of the first flange; in the same way, each festoon 41a of the first flange 41 is separated from its neighbor by a setback 41b coinciding with a festoon 42a of the second flange 42. Each festoon 41a, 42a is provided with at least one bore 47, 48.

The flange 51 of the exhaust cone 22 is a conventional flange extending radially continuously all around the upstream periphery of the exhaust cone 22. It has bores 52 coinciding with the bores 47, 48 in the festoons 41a, 42a.

Figure 5:
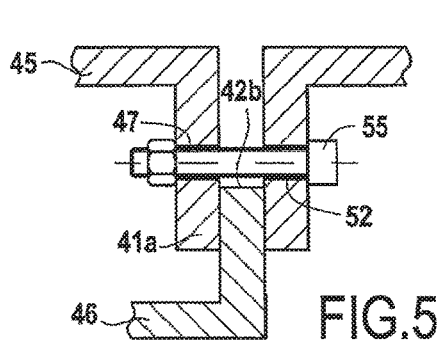
FIG. 5 is a section view on plane V-V of FIG. 4.
Figure 6:
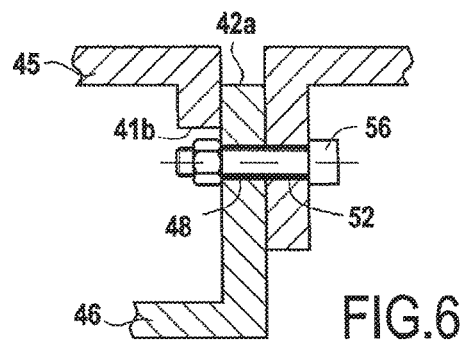
FIG. 6 is a section view on plane VI-VI of FIG. 4.

As can be seen in FIGS. 5 and 6, it is then possible to fasten the fastener flange 41 of the exhaust cone 22 in independent manner to the first fastener flange 41 of the casing 33 by using fastener means 55 of a first type, and to the second fastener flange 42 of the casing 33 by using fastener means 56 of a second type.

The first fastener means 55 have the feature of being breakable, i.e. they break when they are subjected to a stress exceeding a certain threshold.

Conversely, the second fastener means 56 are not breakable and cannot break or become undone while the propulsive assembly is in operation.

In the present example, the second fastener means are conventional bolts 56, while the first fastener means are break bolts 55 each possessing a segment of reduced thickness that is capable of breaking when the moment on the flanges 41 and 51 exceeds a predetermined threshold, e.g. a threshold lying in the range $10.10^3$ newton-meters (N.m) to $50.10^3$ N.m for a two-spool bypass turbojet.

Figure 7:
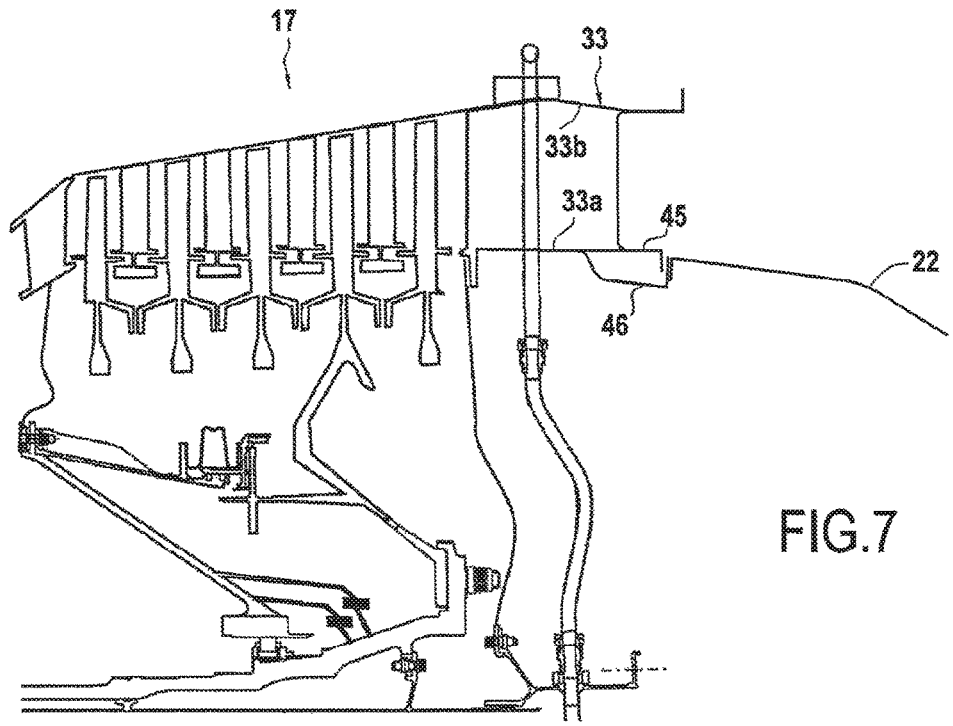
FIG. 7 is a section view of the interface zone between the rear turbine casing and the exhaust cone after the fusible fastener means have broken.

Thus, in the event of an unusual moment appearing that acts on the interface between the rear turbine casing 33 and the exhaust cone 22, e.g. excited by an unbalance of the fan 12 caused by ingesting a bird, the break bolt 53 breaks so that the exhaust cone 22 then remains fastened to the rear turbine casing 33 via only the second fastener flange 42. The connection of the exhaust cone 22 to the body 43 of the rear turbine casing 33, and thus to the remainder of the propulsive assembly 1, then takes place exclusively via the flexible force path of the second connection portion 46: as can be seen in FIG. 7, the lower stiffness of this connection then gives the exhaust cone 22 greater freedom of movement. Furthermore, this reduction of stiffness changes the dynamic response of the system, and in particular causes the modes of vibration of the propulsive assembly to be shifted and attenuated.

Figure 8:
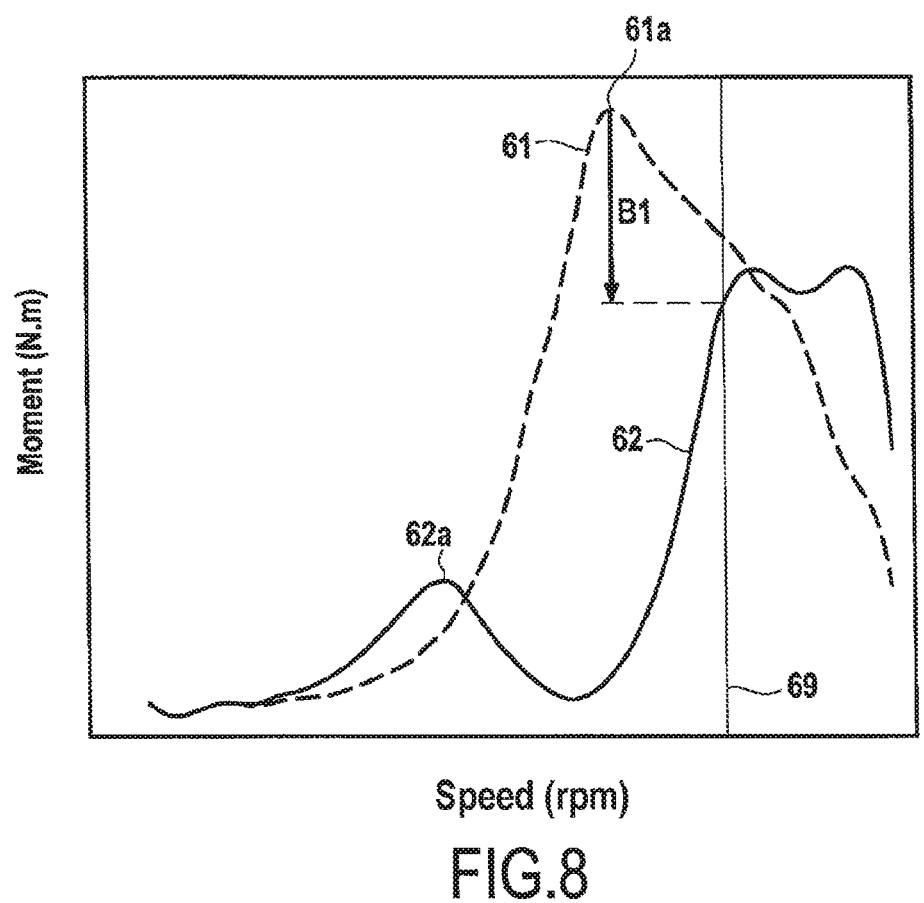
FIG. 8 is a graph showing how the moment at the flanges between the inter-turbine casing and the LP turbine casing varies as a function of the speed of rotation of the engine.

FIG. 8 shows this phenomenon by means of a graph plotting the moment that acts on the flanges forming the interface between the inter-turbine casing 32 and the LP turbine casing 17 as a function of the engine speed in the event of a limiting unbalance in the fan 12 (where the value of this limiting unbalance is defined by certification regulations).

The curve in dashed line 61 corresponds to the situation in which the exhaust cone 22 remains rigidly fastened to the rear turbine casing 33, i.e. in the absence of the releasable fastening provided by the break bolts 55. In contrast, the curve in continuous line 62 corresponds to the situation after the break bolts 55 have broken, and thus after the exhaust cone 22 has been decoupled relative to the rigid force path 45 of the rear turbine casing 33. The vertical line 69 defines the upper limit of the normal operating range of the engine. Certification tests need to be carried out at such a limiting speed.

It can thus be seen in FIG. 8 that in the absence of decoupling of the present invention, the moment at the interface between the inter-turbine casing 32 and the LP turbine casing 17 presents a large peak 61a in the operating range of the engine. In contrast, after decoupling, this mode 62a is offset to a lower frequency, and above all it presents much lower magnitude. There can also be seen a significant drop B1 of about 30% in the maximum moment that occurs in the operating range of the engine, thus making it possible to lighten the structures of the turbine engine, and in particular to reduce the thicknesses of the casings, to reduce the number of fastener bolts used, or indeed to use different materials.

In the present disclosure, it is the interface between the rear turbine casing 33 and the exhaust cone 22 that is described in detail by way of example. Nevertheless, it should be observed that significant improvements can likewise be obtained by making use of such a configuration between other pairs of portions of the casing of the turbine engine and/or of the nacelle. Thus, by way of example, it is possible to install an analogous configuration at the interface between the outer shroud 33b of the rear turbine casing 33 and the nozzle 23, or indeed between the air intake duct 21 and the fan casing 31, to mention only those two examples.

In any event, the embodiments described in the present disclosure are given by way of non-limiting illustration, and in the light of this disclosure, a person skilled in the art can easily modify these embodiments or envisage others while remaining within the ambit of the invention.

Furthermore, the various characteristics of these embodiments may be used singly or they may be combined with one another. When they are combined, the characteristics may be combined as described above or differentially, the invention not being limited to the specific combinations described in the present disclosure. In particular, unless specified to the contrary, a characteristic described with reference to any embodiment may be applied in analogous manner to some other embodiment.

The invention claimed is:

1. A propulsive assembly including a turbine engine configured to be fastened to an aircraft by means of a suspension, the assembly comprising at least first and second casing portions extending axially one after another:
   one of said casing portions being cantilevered out relative to said suspension;
   wherein the first casing portion possesses a first fastener portion connected rigidly to a body of the first casing portion and a second fastener portion connected more flexibly to the body of the first casing portion; and
   wherein the second casing portion is fastened to the second fastener portion of the first casing portion in a manner that is permanent during operation of the propulsive assembly, and to the first fastener portion of the first casing portion in a manner that is releasable during operation of the propulsive assembly.

2. A propulsive assembly according to claim 1, wherein one of said first and second casing portions that is cantilevered out relative to the suspension is cantilevered out relative to a casing portion that is directly connected to the suspension.

3. A propulsive assembly according to claim 2, wherein said casing portion that is directly connected to the suspension is the other one of said first and second casing portions.

4. A propulsive assembly according to claim 1, wherein the turbine engine comprises a rotor and a stator, the rotor including a fan driven by a shaft mounted to rotate relative to the stator via at least two bearings, and
   wherein the center of gravity of said casing portion that is cantilevered out relative to the suspension is situated axially further upstream than the most upstream of said bearings or further downstream than the most downstream of said bearings.

5. A propulsive assembly according to claim 1, wherein the first fastener portion of the first casing portion is connected to the body of the first casing portion by means of a first connection portion, and the second fastener portion of the first casing portion is connected to the body of the first casing portion by means of a second connection portion; and wherein the second connection portion possesses bending stiffness that is at least 10% less than the bending stiffness of the first connection portion.

6. A propulsive assembly according to claim 1, wherein the first fastener portion of the first casing portion is a first fastener flange;

wherein the second fastener portion of the first casing portion is a second fastener flange; and wherein the second casing portion is fastened to the first and second fastener portions of the first casing portion by means of a common fastener flange.

7. A propulsive assembly according to claim 6, wherein the first and second fastener portions of the first casing portion are festooned.

8. A propulsive assembly according to claim 1, wherein the second casing portion is fastened in releasable manner to the first fastener portion of the first casing portion by using breakable fastener means.

9. A propulsive assembly according to claim 1, further including a nacelle, wherein one of said first and second casing portions is a casing portion of the turbine engine, while the other one of the casing portions is a casing portion of the nacelle.

10. A propulsive assembly according to claim 9, wherein said casing portion of the nacelle is an exhaust cone, a nozzle, or an air intake duct.

\* \* \* \* \*